(12) United States Patent
Zheng

(10) Patent No.: US 11,686,933 B2
(45) Date of Patent: Jun. 27, 2023

(54) IMAGING VIA DIFFUSER MODULATION BY TRANSLATING A SAMPLE

(71) Applicant: University of Connecticut, Farmington, CT (US)

(72) Inventor: Guoan Zheng, Vernon, CT (US)

(73) Assignee: University of Connecticut, Farmington, CT (US)

( * ) Notice: Subject to any disclaimer, the term of this patent is extended or adjusted under 35 U.S.C. 154(b) by 0 days.

(21) Appl. No.: 17/946,833

(22) Filed: Sep. 16, 2022

(65) Prior Publication Data

US 2023/0009830 A1    Jan. 12, 2023

Related U.S. Application Data

(62) Division of application No. 16/819,041, filed on Mar. 14, 2020, now Pat. No. 11,487,099.

(60) Provisional application No. 62/825,120, filed on Mar. 28, 2019.

(51) Int. Cl.
  *G02B 21/36* (2006.01)
  *G01N 15/10* (2006.01)
  *G01N 1/28* (2006.01)
  *G01N 15/14* (2006.01)

(52) U.S. Cl.
  CPC ......... *G02B 21/367* (2013.01); *G01N 1/2806* (2013.01); *G01N 15/10* (2013.01); *G02B 21/36* (2013.01); *G01N 2015/1493* (2013.01)

(58) Field of Classification Search
  CPC .... G02B 21/367; G02B 21/36; G01N 1/2806; G01N 15/10; G01N 2015/1493
  See application file for complete search history.

(56) References Cited

U.S. PATENT DOCUMENTS

| | | | |
|---|---|---|---|
| 2016/0195705 A1* | 7/2016 | Betzig | G02B 27/58 348/79 |
| 2018/0025475 A1* | 1/2018 | Kato | H04N 25/44 348/241 |
| 2018/0247106 A1* | 8/2018 | Javidi | G06V 20/693 |
| 2019/0011882 A1* | 1/2019 | Gusyatin | C12M 41/36 |
| 2019/0043687 A1* | 2/2019 | Chen | G02B 21/0056 |

* cited by examiner

*Primary Examiner* — John R Schnurr
(74) *Attorney, Agent, or Firm* — McCarter & English, LLP

(57) ABSTRACT

An imaging system includes a sample mount for holding a sample to be imaged, a light source configured to emit a light beam to be incident on the sample, a translation mechanism coupled to the sample mount and configured to scan the sample to a plurality of sample positions in a plane substantially perpendicular to an optical axis of the imaging system, a mask positioned downstream from the sample along the optical axis, and an image sensor positioned downstream from the mask along the optical axis. The image sensor is configured to acquire a plurality of images as the sample is translated to the plurality of sample positions. Each respective image corresponds to a respective sample position. The imaging system further includes a processor configured to process the plurality of images to recover a complex profile of the sample based on positional shifts extracted from the plurality of images.

20 Claims, 13 Drawing Sheets

IMAGING VIA DIFFUSER MODULATION BY TRANSLATING A SAMPLE

CROSS-REFERENCE TO RELATED APPLICATIONS

This application is a divisional application of U.S. patent application Ser. No. 16/819,041, filed on Mar. 14, 2020, which claims the benefit of and priority to U.S. Provisional Application No. 62/825,120, filed Mar. 28, 2019, each of which is incorporated by reference herein in its entirety.

STATEMENT AS TO RIGHTS TO INVENTIONS MADE UNDER FEDERALLY SPONSORED RESEARCH AND DEVELOPMENT

This invention was made with government support under Grant No. 1510077 awarded by the National Science Foundation. The government has certain rights in the invention.

TECHNICAL FIELD

Embodiments of the present invention relate to imaging systems, more particularly to super-resolution microscopy imaging systems.

BACKGROUND

It may be desirable to achieve a high spatial resolution and a wide field of view (FOV) simultaneously in a microscopy imaging system. In conventional microscope systems, a combination of an objective lens and a tube lens may be used to image an object. Designing a high numerical aperture (NA) lens with diffraction-limited performance over a large field of view may be challenging. In addition, conventional microscope systems with optical lenses tend to be bulky and expensive. Therefore, there is a need for improved microscopy imaging systems.

SUMMARY

According to some embodiments, an imaging system includes a sample mount for holding a sample to be imaged, a light source configured to emit a light beam to be incident on the sample, a translation mechanism coupled to the sample mount and configured to scan the sample to a plurality of sample positions in a plane substantially perpendicular to an optical axis of the imaging system, a mask positioned downstream from the sample along the optical axis, and an image sensor positioned downstream from the mask along the optical axis. The image sensor is configured to acquire a plurality of images as the sample is translated to the plurality of sample positions. Each respective image corresponds to a respective sample position. The imaging system further includes a processor configured to process the plurality of images to recover a complex profile of the sample based on positional shifts extracted from the plurality of images.

According to some embodiments, an imaging system includes a sample mount for holding a sample to be imaged, a light source configured to emit a light beam to be incident on the sample, a translation mechanism coupled to the sample mount and configured to scan the sample to a plurality of sample positions in a plane substantially perpendicular to an optical axis of the imaging system, and an image sensor positioned downstream from the phase mask along the optical axis. A top surface of the image sensor is tilted with respect to a surface of the sample. The image sensor is configured to acquire a plurality of images as the sample is translated to the plurality of sample positions. Each respective image corresponds to a respective sample position. The imaging system further includes a processor configured to process the plurality of images to recover a complex profile of the sample based positional shifts extracted from the plurality of images.

According to some embodiments, an imaging system includes a sample mount for holding a sample to be imaged, a light source configured to emit a light beam, the light beam including light in a plurality of wavelengths, and a light dispersing element configured to disperse the light beam into a plurality of sub light beams to be incident on the sample at a plurality of angles of incidence. Each respective sub light beam corresponds to a respective wavelength and is incident on the sample at a respective angle of incidence. The imaging system further includes a translation mechanism coupled to the sample mount and configured to scan the sample to a plurality of sample positions in a plane substantially perpendicular to an optical axis of the imaging system, a mask positioned downstream from the sample along the optical axis, and an image sensor positioned downstream from the mask along the optical axis. The image sensor is configured to acquire a plurality of images as the sample is translated to the plurality of sample positions. Each respective image corresponds to a respective sample position. The imaging system further includes a processor configured to process the plurality of images to recover a plurality of complex profiles of the sample based on positional shifts extracted from the plurality of images. Each respective complex profile of the sample corresponds to a respective wavelength.

According to some embodiments, an imaging system includes a sample mount for holding a sample to be imaged, a light source configured to emit a light beam, a diffuser positioned in front of the light source and configured to transform the light beam into a speckle illumination beam characterized by a speckle pattern, a mirror configured to receive and reflect the speckle illumination beam toward the sample, a scanning mechanism coupled to the mirror and configured to scan the mirror to a plurality of mirror angles such that the speckle illumination beam is incident on the sample at a plurality of angles of incidence, and an image sensor positioned downstream from the sample along an optical axis of the imaging system. The image sensor is configured to acquire a plurality of images as the mirror is being scanned so that the speckle illumination beam is incident on the sample at the plurality of angles of incidence. Each respective image corresponds to a respective angle of incidence. The imaging system further includes a processor configured to process the plurality of images to recover a complex profile of the sample based on positional shifts extracted from the plurality of images.

According to some embodiments, an imaging system includes a sample mount for holding a sample to be imaged, a light source configured to emit a light beam to be incident on the sample, a mask positioned downstream from the sample along an optical axis of the imaging system, a translation mechanism coupled to the mask and configured to scan the mask to a plurality of mask positions in a plane substantially perpendicular to the optical axis of the imaging system, and an image sensor positioned downstream from the mask along the optical axis. The image sensor is configured to acquire a plurality of images as the mask is scanned to the plurality of mask positions. Each respective image corresponds to a respective mask position. The imaging system further includes a processor configured to process the plurality of images to recover a complex profile of the sample based on positional shifts extracted from the plurality of images.

According to some embodiments, an imaging system includes a sample mount for holding a sample to be imaged, a light source configured to emit a light beam to be incident on the sample, a first transparent plate positioned downstream from the sample along an optical axis of the imaging system, a scanning mechanism coupled to the first transparent plate and configured to rotate the first transparent plate around a first axis orthogonal to the optical axis so that the first transparent plate is rotated to a plurality of first angles, a mask positioned downstream from the first transparent plate along the optical axis, and an image sensor positioned downstream from the mask along the optical axis. The image sensor is configured to acquire a plurality of images as the first transparent plate is scanned to the plurality of first angles. Each respective image corresponds to a respective first angle. The imaging system further includes a processor configured to process the plurality of images to recover a complex profile of the sample based on positional shifts extracted from the plurality of images.

BRIEF DESCRIPTION OF THE DRAWINGS

FIG. 2A shows a captured raw image of a phase target under uniform illumination obtained using the imaging system shown in FIG. 1 according to some embodiments.

FIG. 2B shows a captured raw image of the a phase target under speckle illumination obtained using the imaging system shown in FIG. 1 according to some embodiments.

FIG. 2C shows a recovered image of the phase target obtained using the imaging system shown in FIG. 1 according to some embodiments.

FIG. 3A shows a recovered phase profile along a circle of the phase target in FIG. 2C.

FIG. 3B shows a recovered height profile of the phase target for visualization.

DETAILED DESCRIPTION

Embodiments of the present invention provide various imaging systems for achieving super-resolution imaging via translated speckle illumination, translated pattern modulation, translated phase modulation, and wavelength-encoded mask modulation. In some embodiments, the imaging systems may not include any optical lens. Such imaging system are referred herein as lensless imaging systems. Compared with conventional microscope imaging systems, the imaging systems according to embodiments of the present invention may be able to achieve high spatial resolution and large field of view at the same time. The achievable spatial resolution may surpass the diffraction-limited resolution of conventional microscope imaging systems.

The imaging systems according to embodiments of the present invention may have applications in digital pathology, quantitative phase imaging, and the like. In addition, these imaging platforms can be employed in visible light imaging systems, coherent X-ray imaging systems, and electron imaging systems to increase spatial resolution and provide quantitative absorption and object phase contrast.

The imaging systems according to embodiments of the present invention may afford numerous advantages. For example, by not including any optical lens, the imaging systems may be made to be compact, portable, and cost-effective, and therefore may be suitable for deployment in point-of-care settings.

Imaging via Translated Speckle Illumination

Figure 1:
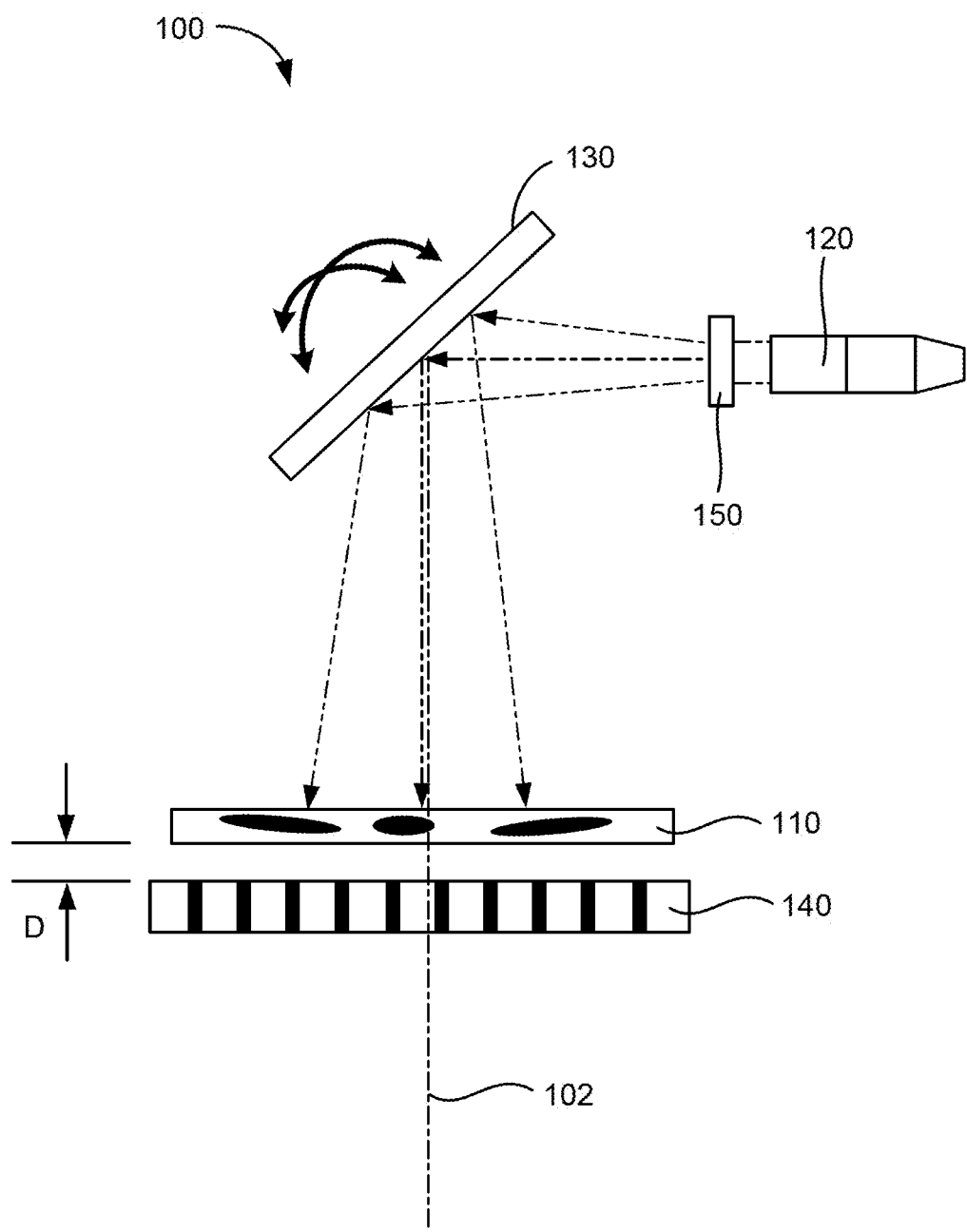
FIG. 1 shows a schematic diagram of an imaging system 100 according to some embodiments.

FIG. 1 shows a schematic diagram of an imaging system 100 according to some embodiments. The imaging system 100 includes an image sensor 140. A sample 110 to be imaged may be placed above the image sensor 140. For example, the sample 110 may be held by a sample mount (not shown in FIG. 1). In some embodiments, the distance D between the sample 110 and the image sensor 140 may be rather small. For example, the distance D may be less than about 1 mm (e.g., about 500 µm).

The imaging system 100 further includes a light source 120. The light source 120 may comprise a laser or a light-emitting diode (LED), and is configured to emit a coherent or partially coherent light beam. The light beam may be collimated, partially collimated, or uncollimated. The imaging system 100 further includes a diffuser 150 positioned in front of the light source 120. The diffuser 150 may include an unknown pattern formed thereon. Thus, as the light beam emitted by the light source 120 passes through the diffuser 150, the light beam may be transformed into a speckle illumination beam. The imaging system 100 may further include a mirror 130 configured to receive and reflect the speckle illumination beam toward the sample 110.

The imaging system 100 further includes a scanning mechanism (not shown in FIG. 1) coupled to the mirror 130 and configured to scan the mirror 130 to a plurality of mirror angles, such that the speckle pattern incident on the sample 110 has a plurality of translational shifts. For example, the scanning mechanism may comprise a galvo scanner. The mirror 130 may be scanned in one dimension or two dimensions. For example, the mirror 130 may be scanned in the pitch direction (e.g., around an axis perpendicular to the page, so that the speckle illumination beam is scanned left and right in the page), or in the roll direction (e.g., so that the speckle illumination beam is scanned in and out of the page), or in both the pitch direction and the roll direction.

The image sensor 140, which is positioned downstream from the sample 110 along the optical axis 102 of the imaging system 100, is configured to capture a plurality of images as the speckle illumination beam is incident on the sample 110 at the plurality of angles of incidence. Each respective image corresponds to a respective angle of incidence. The plurality of images may be processed by a processor (not shown in FIG. 1) to produce a complex profile of the sample 110 based on cross-correlations among the plurality of images.

According to some embodiments, to address the positioning repeatability and accuracy issues, the positional shifts of the speckle pattern are recovered based on the phase correlations among of the plurality of images. To bypass the resolution limit set by the pixel size of the image sensor 140, a sub-sampled ptychographic phase retrieval process is used to recover the complex profile of the sample 110. The complex profile of the sample 110 may include an intensity image as well as a phase image of the sample 110. The reconstruction process may recover the unknown speckle pattern as well.

According to some embodiments, the reconstruction process may include the following steps.

At S101, initialize the complex object O(x,y) (e.g., the sample) and the speckle pattern P(x,y).

At S102, estimate the $j^{th}$ translated position of the speckle pattern $(x_j, y_j)$ based on image cross-correlation, or other tracking algorithms such as mutual information optimization and the like.

At S103, according to the imaging model, generate the $j^{th}$ complex image's exit wave $\psi_j(x,y)$ at the image sensor plane based on the translated position $(x_j, y_j)$, O(x,y), and P(x,y):

$$\psi_j(x,y) = (O(x,y) \cdot P(x-x_j, y-y_j)) * PSF_{free}(d) = \varphi_j(x,y) * PSF_{free}(d),$$

where $(x_j, y_j)$ is the $j^{th}$ positional shift of the speckle pattern, $PSF_{free}(d)$ is the point spread function (PSF) for free-space propagation over a distance d, and '*' stands for convolution operation, and $\varphi_j(x,y) = O(x,y) \cdot P(x-x_j, y-y_j)$.

At S104, at the image sensor plane, use the following equation to update the exit wave $\psi_j(x,y)$ based on the captured intensity image $I_j(x,y)$:

$$\psi'_j(x, y) = \psi_j(x, y) \left( \frac{\sqrt{I_j(x, y)_{\uparrow M}}}{\sqrt{|\psi_j(x, y)|^2 * ones(M, M)_{\downarrow M \uparrow M}}} \right).$$

In the above equation, the image sizes of $\psi_j(x,y)$ and $I_j(x,y)$ are different. If $I_j$ has a size of 100 by 100 pixels, $\psi_j$ will have 300 by 300 pixels, with an up-sampling factor M=3. The term '$I_j(x,y)_{\uparrow M}$' represents the nearest-neighbor up-sampling of the captured image $I_j$. In the denominator of the above equation, the term $|\psi_j(x,y)|^2$ first convolutes with an average filter (M by M all-one matrix ones(M,M)). It will be then down-sampling by M-times followed by nearest-neighbor up-sampling of M-times. In some embodiments, other up-sampling factor (e.g., M=4, 5, 6, . . . ) may be used.

At S105, propagate the updated $\psi'_j(x,y)$ to the object plane and get $\psi'_j(x_j, y_j)$. Update the object and P(x,y):

$$O(x, y) = O(x, y) + \frac{conj(P(x-x_j, y-y_j))(\varphi'_j - \varphi_j)}{(1 - \alpha_{obj})|P(x-x_j, y-y_j)|^2 + \alpha_{obj}|P(x-x_j, y-y_j)|^2_{max}},$$

$$P(x-x_j, y-y_j) = P(x-x_j, y-y_j) + \frac{conj(O)(\varphi'_j - \varphi_j)}{(1 - \alpha_P)|O|^2 + \alpha_P|O|^2_{max}},$$

where 'conj' denotes conjugate, and $\alpha_{obj}$ and $\alpha_P$ are algorithm.

At S106, j=j+1 and repeat steps S102-S105.

At S107, repeat steps S102-S106 until the solution converges.

It should be appreciated that the specific steps S101-S107 discussed above provide a particular reconstruction process according to some embodiments. Other sequences of steps may also be performed according to alternative embodiments. For example, alternative embodiments of the present invention may perform the steps outlined above in a different order. Moreover, the individual steps S101-S107 may include multiple sub-steps that may be performed in various sequences as appropriate to the individual step. Furthermore, additional steps may be added or removed depending on the particular applications. One of ordinary skill in the art would recognize many variations, modifications, and alternatives.

The performance of the imaging system 100 were validated using a resolution target, a phase target, and a biological sample. It was demonstrated that accurate, high-quality complex images can be obtained from an image set including as few as 10 images. In some embodiments, a 6.4 mm by 4.6 mm field of view (FOV) and a half pitch resolution of 1 µm can be achieved.

Figure 2A:
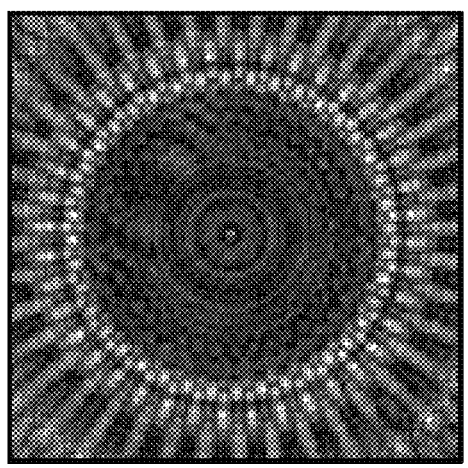
FIGS. 2A-2C and 3A-3B illustrate the performance of the imaging system shown in FIG. 1 using a quantitative phase target as the sample according to some embodiments.
Figure 2B:
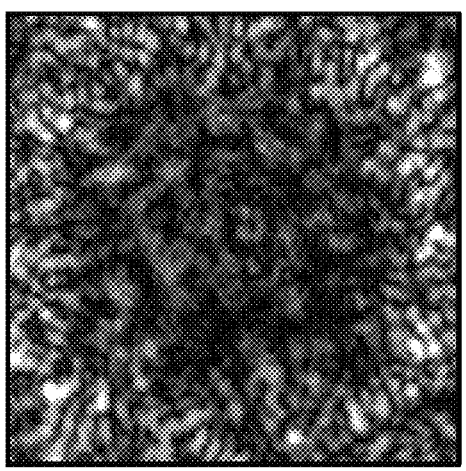
Figure 2C:
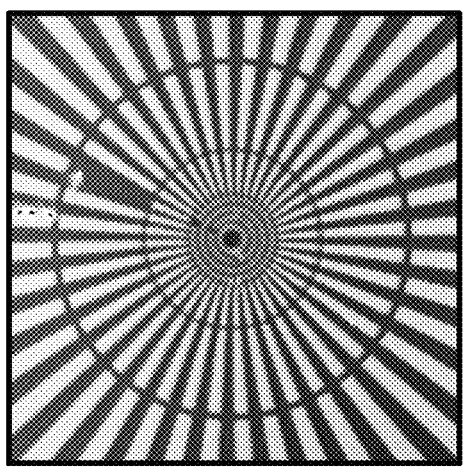
Figure 3A:
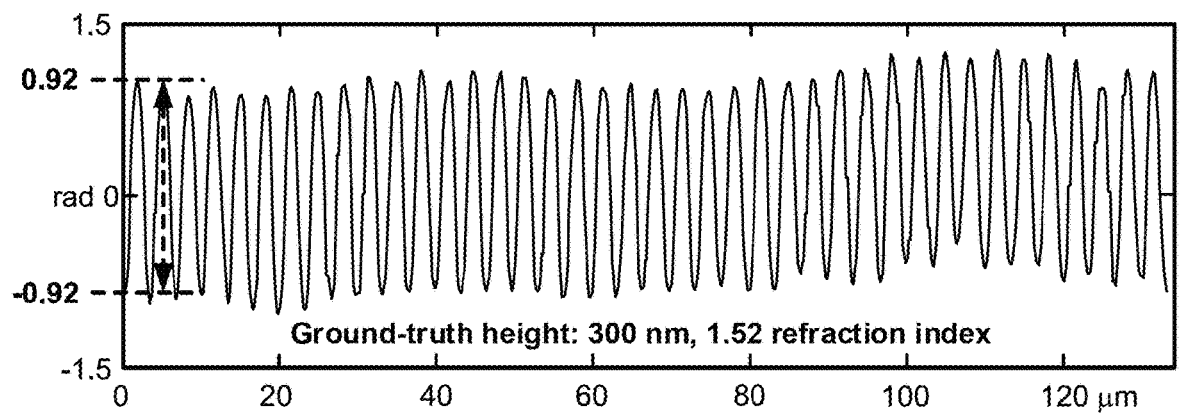
Figure 3B:
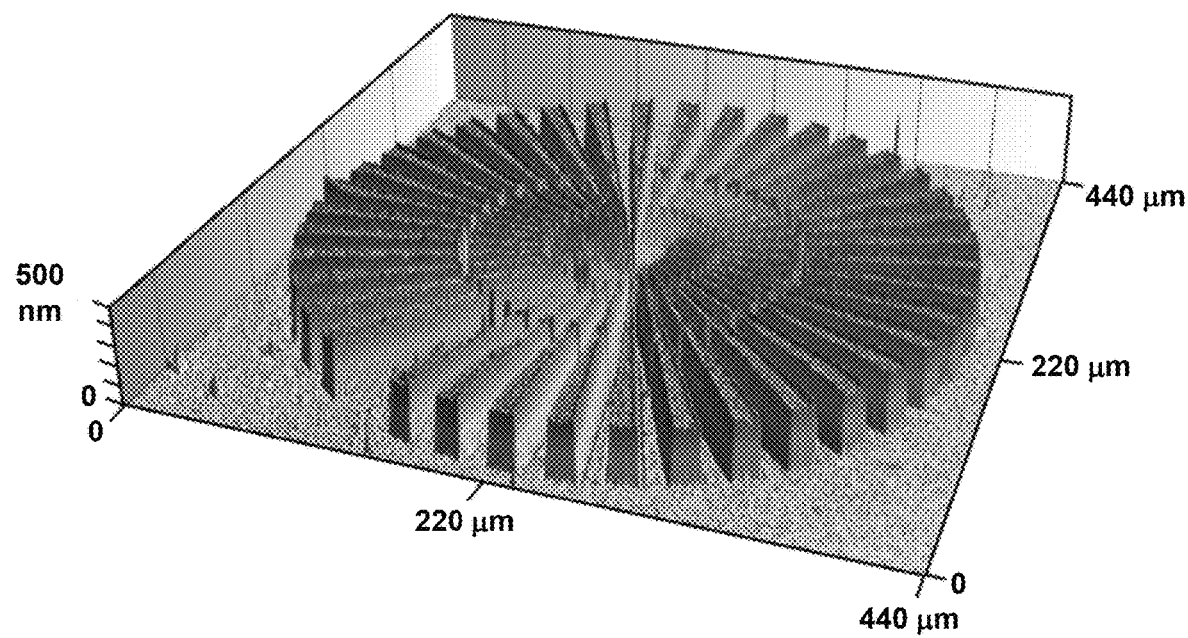

FIGS. 2A-2C and 3A-3B illustrate the performance of the imaging system 100 using a quantitative phase target as the sample according to some embodiments. FIG. 2A shows a captured raw image under uniform illumination. FIG. 2B shows a captured raw image under speckle illumination. FIG. 2C shows a recovered image of the phase target. FIG. 3A shows a recovered phase profile along a circle of the phase target in FIG. 2C. As illustrated, the recovered phase is in a good agreement with the ground-truth height of the phase target. FIG. 3B shows a recovered height profile of the phase target for visualization.

Figure 4:
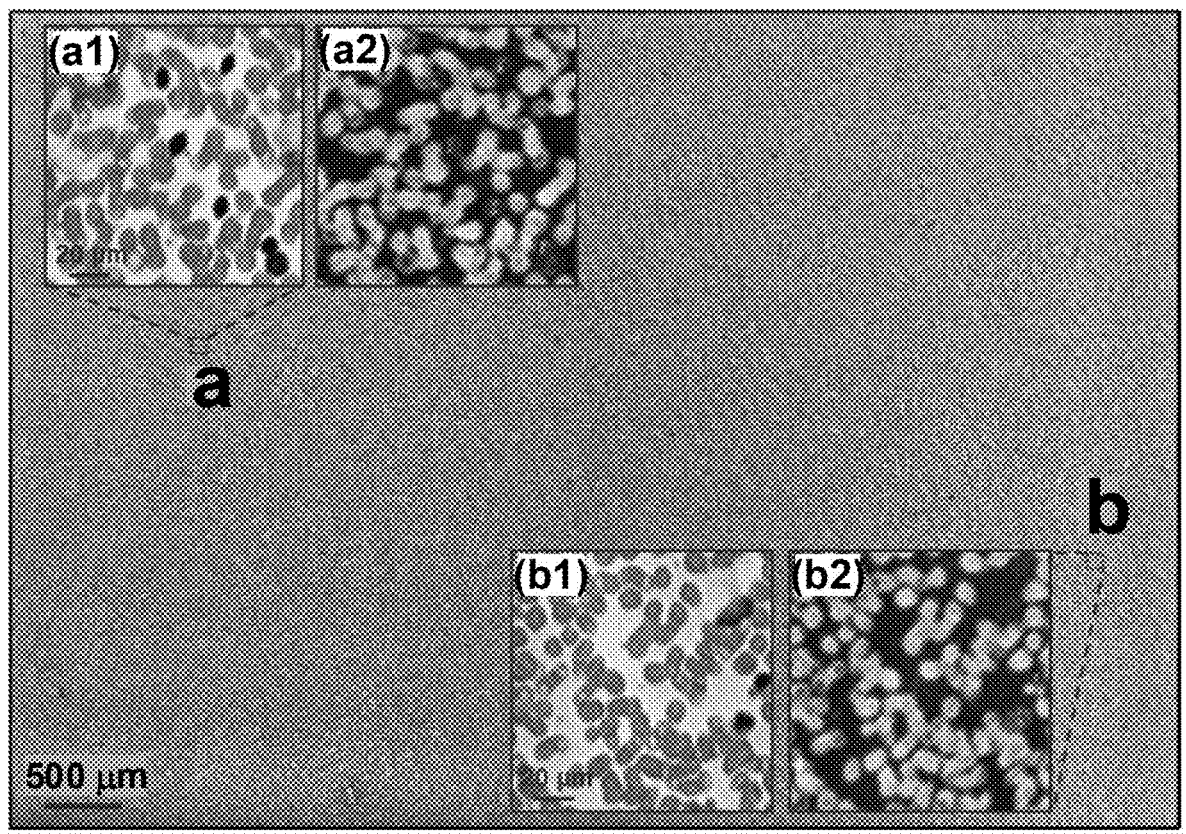
FIG. 4 shows a full field of view reconstruction of a blood smear sample from images obtained using the imaging system shown in FIG. 1 according to some embodiments.

FIG. 4 shows a full field of view reconstruction of a blood smear sample according to some embodiments. 400 raw images were used in the reconstruction process and the speckle pattern was treated as unknown. The imaging area is 6.4 mm×4.6 mm, which is limited by the size of the image sensor. The insets (a) show the magnified intensity (a1) and phase (a2) of the highlighted regions (a). The insets (b) show the magnified intensity (b1) and phase (b2) of the highlighted regions (b). Thus, it was demonstrated that the imaging system 100 may achieve both high spatial resolution and wide field of view at the same time, which may be important for microscopy applications.

Imaging via Pattern Modulation

Figure 5:
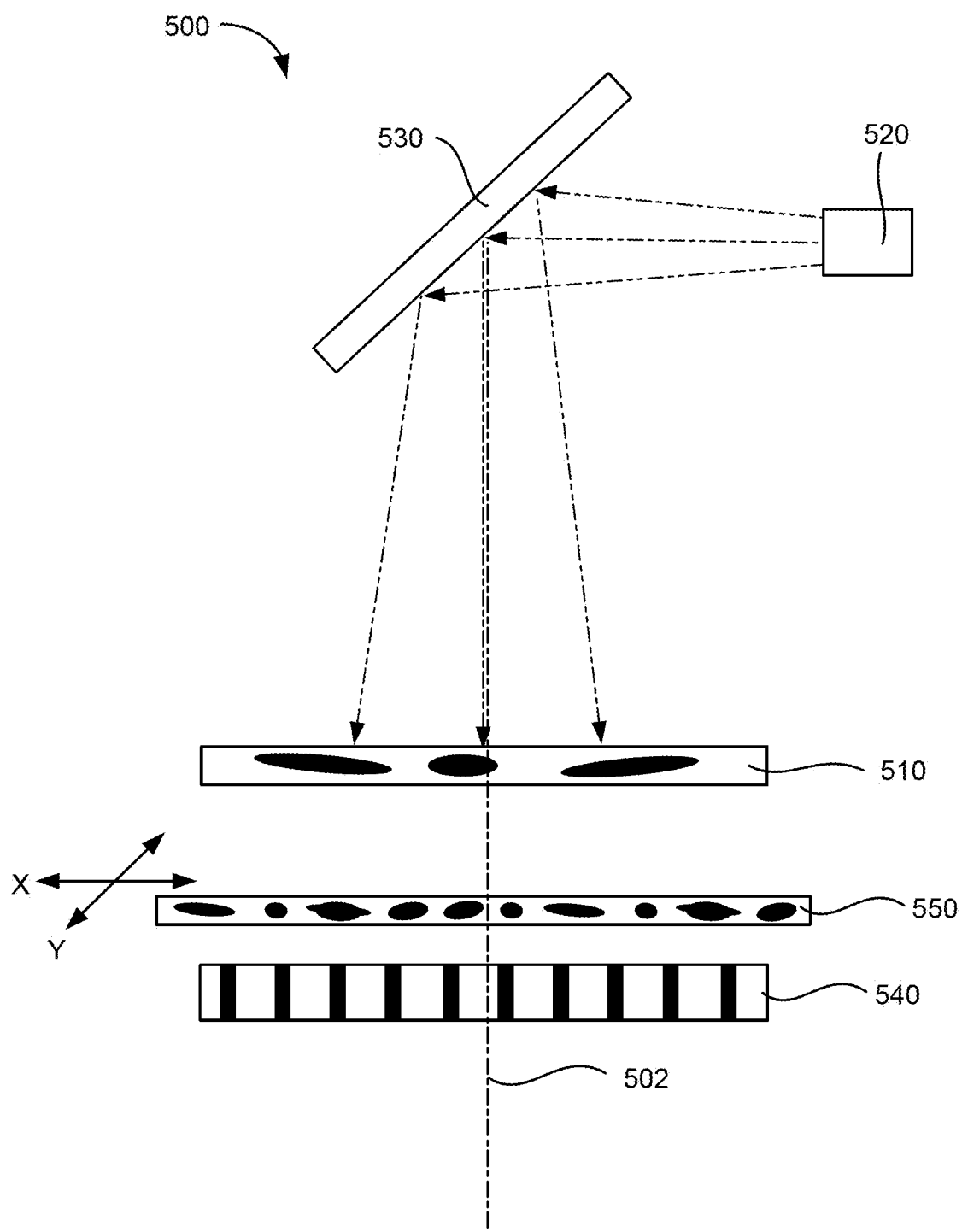
FIG. 5 shows a schematic diagram of an imaging system according to some embodiments.

FIG. 5 shows a schematic diagram of an imaging system 500 according to some embodiments. The imaging system 500 includes an image sensor 540. A sample 510 to be imaged may be placed above the image sensor 540. For example, the sample 510 may be held by a sample mount (not shown in FIG. 5).

The imaging system 500 further includes a light source 520. The light source 520 may comprise a laser or a light-emitting diode (LED), and is configured to emit a coherent or partially coherent light beam to be incident on the sample 510. The light beam may be collimated, partially collimated, or uncollimated. The imaging system 500 may include a mirror 530 positioned substantially at a 45 degree angle with respect to the path of the light beam emitted by the light source 520, so as to fold the light beam for a more compact configuration. The mirror 530 is optional.

The imaging system 500 further includes a mask 550 positioned downstream from the sample 510 along an optical axis 502 of the imaging system 500, and above the image sensor 540. The mask 550 may include an unknown pattern formed thereon. Thus, as the light beam is transmitted through the sample 510 and the mask 550, a diffused image may be formed at the image sensor 540.

The imaging system 500 further includes a translation mechanism (not shown in FIG. 5) coupled to the mask 550 and configured to scan the mask 550 to a plurality of mask positions in a plane (e.g., the X-Y plane) substantially perpendicular to the optical axis 502 of the imaging system 500. According to various embodiments, the mask 550 may be translated in one dimension (e.g., in the X direction or the Y direction), or in two dimensions (e.g., in both the X and the Y directions).

As the mask 550 is scanned, the diffused image formed at the image sensor 540 may shift accordingly. The image sensor 540 is configured to capture a plurality of images as the mask 550 is scanned to the plurality of mask positions. Each respective image corresponds to a respective mask position. The plurality of images may be processed by a processor (not shown in FIG. 5) to produce a complex profile of the sample 510 based on cross-correlations among the plurality of images.

Figure 6:
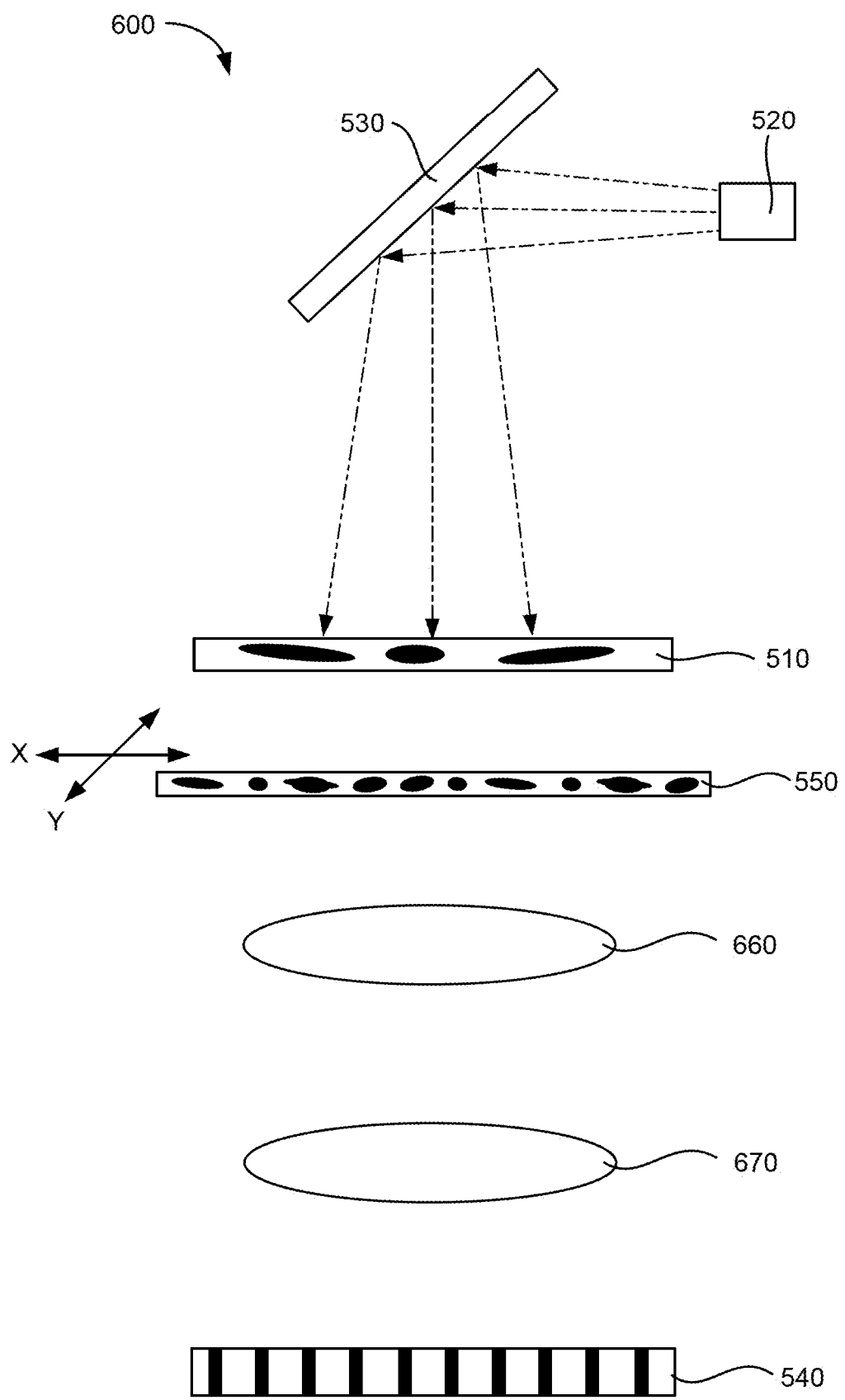
FIG. 6 shows a schematic diagram of an imaging system according to some embodiments.

FIG. 6 shows a schematic diagram of an imaging system 600 according to some embodiments. The imaging system 600 is similar to the imaging system 500 illustrated in FIG. 5, but may further include an objective lens 660 and a tube lens 670 positioned between the mask 550 and the image sensor 540, as in a conventional microscope.

According to some embodiments, the reconstruction process may include the following steps.

At S201, initialize the complex object O(x,y) (e.g., the sample) and the diffuser pattern P(x,y).

At S202, estimate the $j^{th}$ translated position of the diffuser pattern $(x_j,y_j)$ based on image cross-correlation, or other tracking algorithms such as mutual information optimization and the like.

At S203, according to the imaging model, O(x,y) is propagated for distance '$d_1$' to the diffuser plane $$O_{d1}(x,y)=O(x,y)*PSF_{free}(d_1)$$

At S204, generate the $j^{th}$ complex image's exit wave $\psi_j(x,y)$ at the image sensor plane based on the translated diffuser position $(x_j,y_j)$, O(x,y), and P(x,y):

$$\psi_j(x,y)=(O_{d1}(x,y)\cdot P(x-x_j,y-y_j))*PSF_{free}(d)=\varphi_j(x,y)*PSF_{free}(d),$$

where $PSF_{free}(d)$ is the point spread function (PSF) for free-space propagation over a distance d, and '*' stands for convolution operation, and $\varphi_j(x,y)=O_{d1}(x,y)\cdot P(x-x_j,y-y_j)$.

At S205, at the image sensor plane, use the following equation to update the exit wave $\psi_j(x,y)$ based on the captured intensity image $I_j(x,y)$:

$$\psi'_j(x,y) = \psi_j(x,y)\left(\frac{\sqrt{I_j(x,y)_{\uparrow M}}}{\sqrt{|\psi_j(x,y)|^2 * ones(M,M)_{\downarrow M \uparrow M}}}\right).$$

In the above equation, the image sizes of $\psi_j(x,y)$ and $I_j(x,y)$ are different. If $I_j$ has a size of 100 by 100 pixels, $\psi_j$ will have 300 by 300 pixels, with an up-sampling factor M=3. The term '$I_j(x,y)_{\uparrow M}$' represents the nearest-neighbor up-sampling of the captured image $I_j$. In the denominator of the above equation, the term $|\psi_j(x,y)|^2$ first convolutes with an average filter (M by M all-one matrix ones(M,M)). It will be then down-sampling by M-times followed by nearest-neighbor up-sampling of M-times. In some embodiments, other up-sampling factor (e.g., M=4, 5, 6, . . . ) may be used.

At S206, propagate the updated $\psi'_j(x,y)$ to the object plane and get $\psi'_j(x_j,y_j)$. Update the object $O_{d1}(x,y)$ and P(x,y):

$$O_{d1}(x,y) =$$

$$O_{d1}(x,y) + \frac{conj(P(x-x_j,y-y_j))(\varphi'_j-\varphi_j)}{(1-\alpha_{obj})|P(x-x_j,y-y_j)|^2+\alpha_{obj}|P(x-x_j,y-y_j)|^2_{max}},$$

$$P(x-x_j,y-y_j) = P(x-x_j,y-y_j) + \frac{conj(O_{d1})(\varphi'_j-\varphi_j)}{(1-\alpha_P)|O_{d1}|^2+\alpha_P|O_{d1}|^2_{max}},$$

where 'conj' denotes conjugate, and $\alpha_{obj}$ and $\alpha_P$ are algorithm.

At S207, i=j+1 and repeat steps S202-S206.

At S208, repeat steps S202-S207 until the solution converges.

At S209, propagate the recovered $O_{d1}(x,y)$ to the object plane.

It should be appreciated that the specific steps S201-S209 discussed above provide a particular reconstruction process according to some embodiments. Other sequences of steps may also be performed according to alternative embodiments. For example, alternative embodiments of the present invention may perform the steps outlined above in a different order. Moreover, the individual steps S201-S209 may include multiple sub-steps that may be performed in various sequences as appropriate to the individual step. Furthermore, additional steps may be added or removed depending on the particular applications. One of ordinary skill in the art would recognize many variations, modifications, and alternatives.

Imaging via Pattern Modulation Using Rotating Slides

Figure 7:
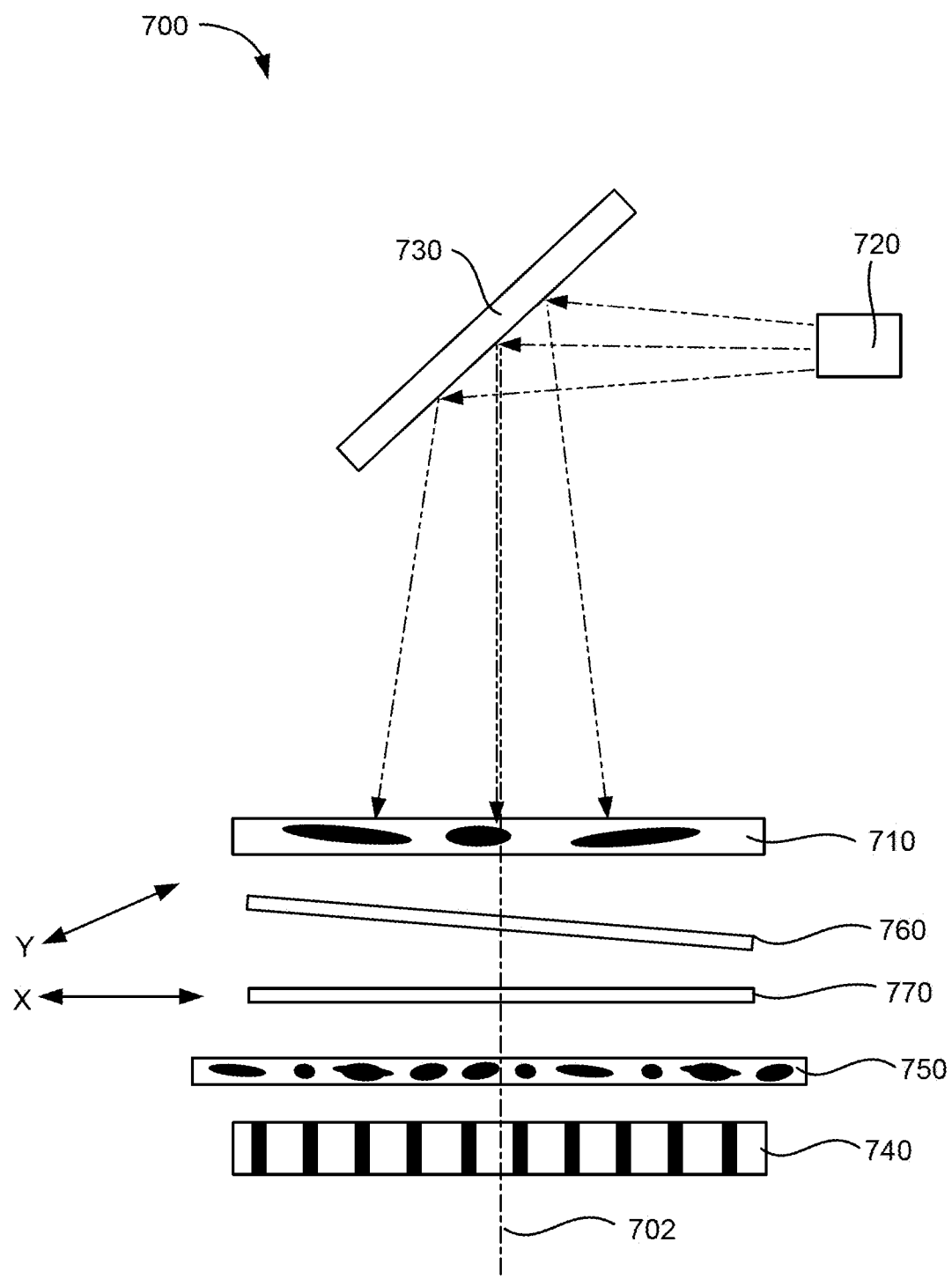
FIG. 7 shows a schematic diagram of an imaging system according to some embodiments.

FIG. 7 shows a schematic diagram of an imaging system 700 according to some embodiments. The imaging system 700 includes an image sensor 740. A sample 710 to be imaged may be placed above the image sensor 740. For example, the sample 710 may be held by a sample mount (not shown in FIG. 7).

The imaging system 700 further includes a light source 720. The light source 720 may comprise a laser or a light-emitting diode (LED), and is configured to emit a coherent or partially coherent light beam to be incident on the sample 510. The light beam may be collimated, partially collimated, or uncollimated. The imaging system 700 may include a mirror 730 positioned substantially at a 45 degree angle with respect to the path of the light beam emitted by the light source 720, so as to fold the light beam for a more compact configuration. The mirror 730 is optional.

The imaging system 700 further includes a mask 750 positioned downstream from the sample 710 along an optical axis 702 of the imaging system 700, and above the image sensor 740. The mask 750 may include an unknown pattern formed thereon. Thus, as the light beam is transmitted through the sample 710 and the mask 750, a diffused image may be formed at the image sensor 740.

The imaging system 700 further includes a first transparent plate 760 and a second transparent plate 770 positioned between the sample 710 and the mask 750. The imaging system 700 may further include a scanning mechanism (not shown in FIG. 7) coupled to the first transparent plate 760 and the second transparent plate 770, and configured to rotate the first transparent plate 760 in one direction (e.g., around the Y-axis, which is perpendicular to the page), and to rotate the second transparent plate 770 in an orthogonal direction (e.g., around the X-axis.) The first transparent plate 760 and the second transparent plate 770 may comprise glass slides or any other transparent dielectric materials. In some embodiments, the imaging system 700 may include only one transparent plate (e.g., the first transparent plate 760 or the second transparent plate 770).

As the first transparent plate 760 and the second transparent plate 770 are rotated, the diffused image formed at the image sensor 740 may shift accordingly. The image sensor 740 is configured to capture a plurality of images as the first transparent plate 760 is scanned to a plurality of first angles and the second transparent plate 770 is scanned to a plurality of second angles. Each respective image corresponds to a respective first angle of the first transparent plate 760 and a respective second angle of the second transparent plate 770. The plurality of images may be processed by a processor (not shown in FIG. 7) to produce a complex profile of the sample 710 based on cross-correlations among the plurality of images.

Figure 8:
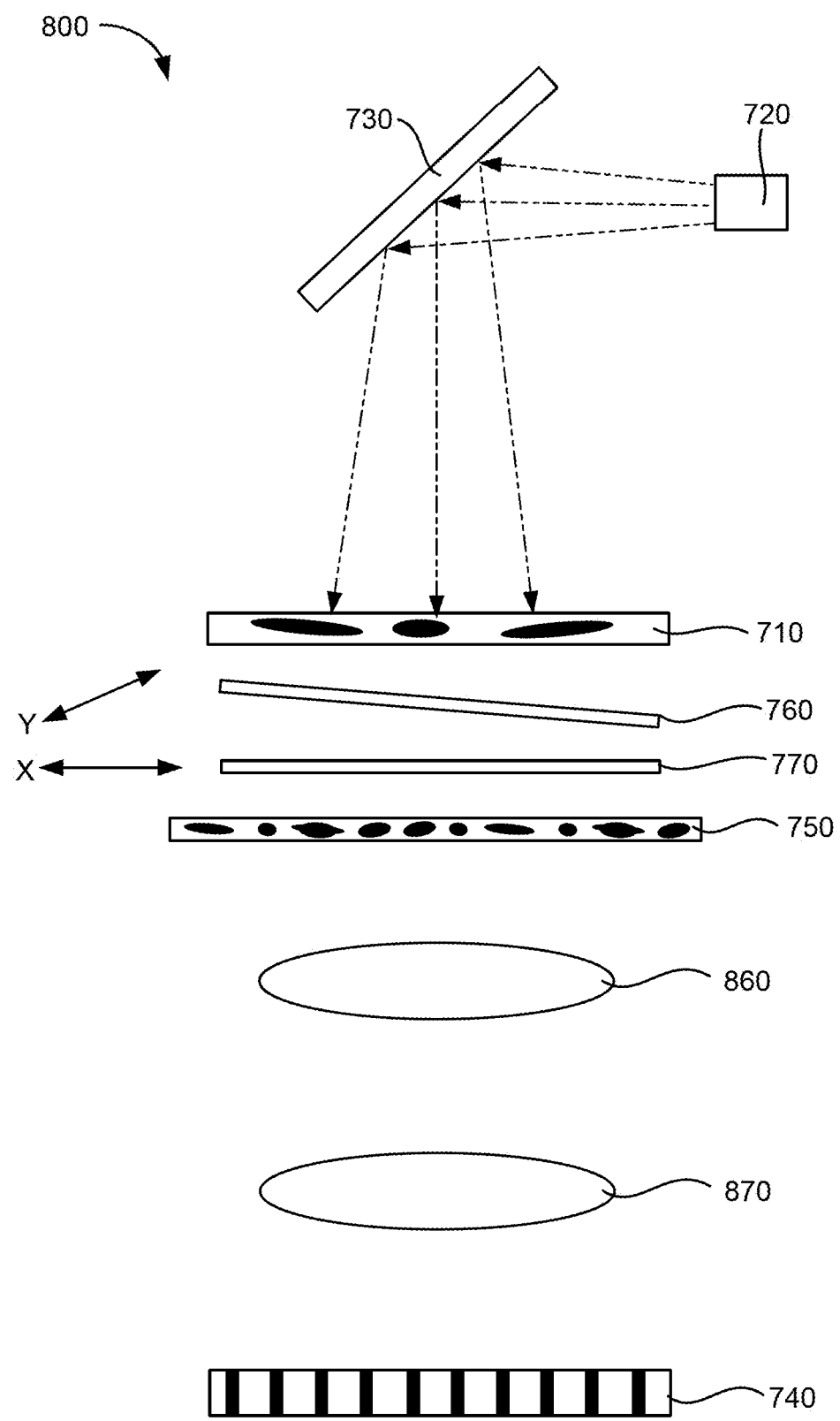
FIG. 8 shows a schematic diagram of an imaging system according to some embodiments.

FIG. 8 shows a schematic diagram of an imaging system 800 according to some embodiments. The imaging system 800 is similar to the imaging system 700 illustrated in FIG. 7, but may further include an objective lens 860 and a tube lens 870 positioned between the mask 750 and the image sensor 740, as in a conventional microscope.

According to some embodiments, the reconstruction process may include the following steps.

At S301, initialize the complex object O(x,y) (e.g., the sample) and the diffuser pattern P(x,y).

At S302, estimate the $j^{th}$ translated position of the sample $(x_j,y_j)$ based on image cross-correlation, or other tracking algorithms such as mutual information optimization and the like.

At S303, according to the imaging model, $O(x-x_j,y-y_j)$ is propagated for distance '$d_1$' to the diffuser plane $$O_{d1}(x-x_j,y-y_j)=O(x-x_j,y-y_j)*PSF_{free}(d_1).$$

At S304, generate the $j^{th}$ complex image's exit wave $\psi_j(x,y)$ at the image sensor plane based on the translated diffuser position $(x_j,y_j)$, O(x,y), and P(x,y):

$$\psi_j(x,y)=(O_{d1}(x-x_j,y-y_j)\cdot P(x,y))*PSF_{free}(d)=\varphi_j(x,y)*PSF_{free}(d),$$

where $PSF_{free}(d)$ is the point spread function (PSF) for free-space propagation over a distance d, and '*' stands for convolution operation, and $\varphi_j(x,y)=O_{d1}(x-x_j,y-y_j)\cdot P(x,y)$.

At S305, at the image sensor plane, use the following equation to update the exit wave $\psi_j(x,y)$ based on the captured intensity image $I_j(x,y)$:

$$\psi'_j(x,y)=\psi_j(x,y)\left(\frac{\sqrt{I_j(x,y)_{\uparrow M}}}{\sqrt{|\psi_j(x,y)|^2 * ones(M,M)_{\downarrow M \uparrow M}}}\right).$$

In the above equation, the image sizes of $\psi_j(x,y)$ and $I_j(x,y)$ are different. If $I_j$ has a size of 100 by 100 pixels, $\psi_j$ will have 300 by 300 pixels, with an up-sampling factor M=3. The term '$I_j(x,y)_{\uparrow M}$' represents the nearest-neighbor up-sampling of the captured image $I_j$. In the denominator of the above equation, the term $|\psi_j(x,y)|^2$ first convolutes with an average filter (M by M all-one matrix ones(M,M)). It will be then down-sampling by M-times followed by nearest-neighbor up-sampling of M-times. In some embodiments, other up-sampling factor (e.g., M=4, 5, 6, ... ) may be used.

At S306, propagate the updated $\psi'_j(x,y)$ to the object plane and get $\psi'_j(x_j,y_j)$. Update the object $O_{d1}(x,y)$ and P(x,y):

$$O_{d1}(x-x_j,y-y_j)=$$

$$O_{d1}(x-x_j,y-y_j)+\frac{conj(P(x,y))(\varphi'_j-\varphi_j)}{(1-\alpha_{obj})|P(x,y)|^2+\alpha_{obj}|P(x,y)|^2_{max}},$$

$$P(x,y)=$$

$$P(x,y)+\frac{conj(O_{d1}(x-x_j,y-y_j))(\varphi'_j-\varphi_j)}{(1-\alpha_P)|O_{d1}(x-x_j,y-y_j)|^2+\alpha_P|O_{d1}(x-x_j,y-y_j)|^2_{max}},$$

where 'conj' denotes conjugate, and $\alpha_{obj}$ and $\alpha_P$ are algorithm.

At S307, j=j+1 and repeat steps S302-S306.

At S308, repeat steps S302-S30 until the solution converges.

At S309, propagates the recovered $O_{d1}(x,y)$ to the object plane.

It should be appreciated that the specific steps S301-S309 discussed above provide a particular reconstruction process according to some embodiments. Other sequences of steps may also be performed according to alternative embodiments. For example, alternative embodiments of the present invention may perform the steps outlined above in a different order. Moreover, the individual steps S301-S309 may include multiple sub-steps that may be performed in various sequences as appropriate to the individual step. Furthermore, additional steps may be added or removed depending on the particular applications. One of ordinary skill in the art would recognize many variations, modifications, and alternatives.

Imaging via Pattern Modulation by Scanning a Sample

Figure 9:
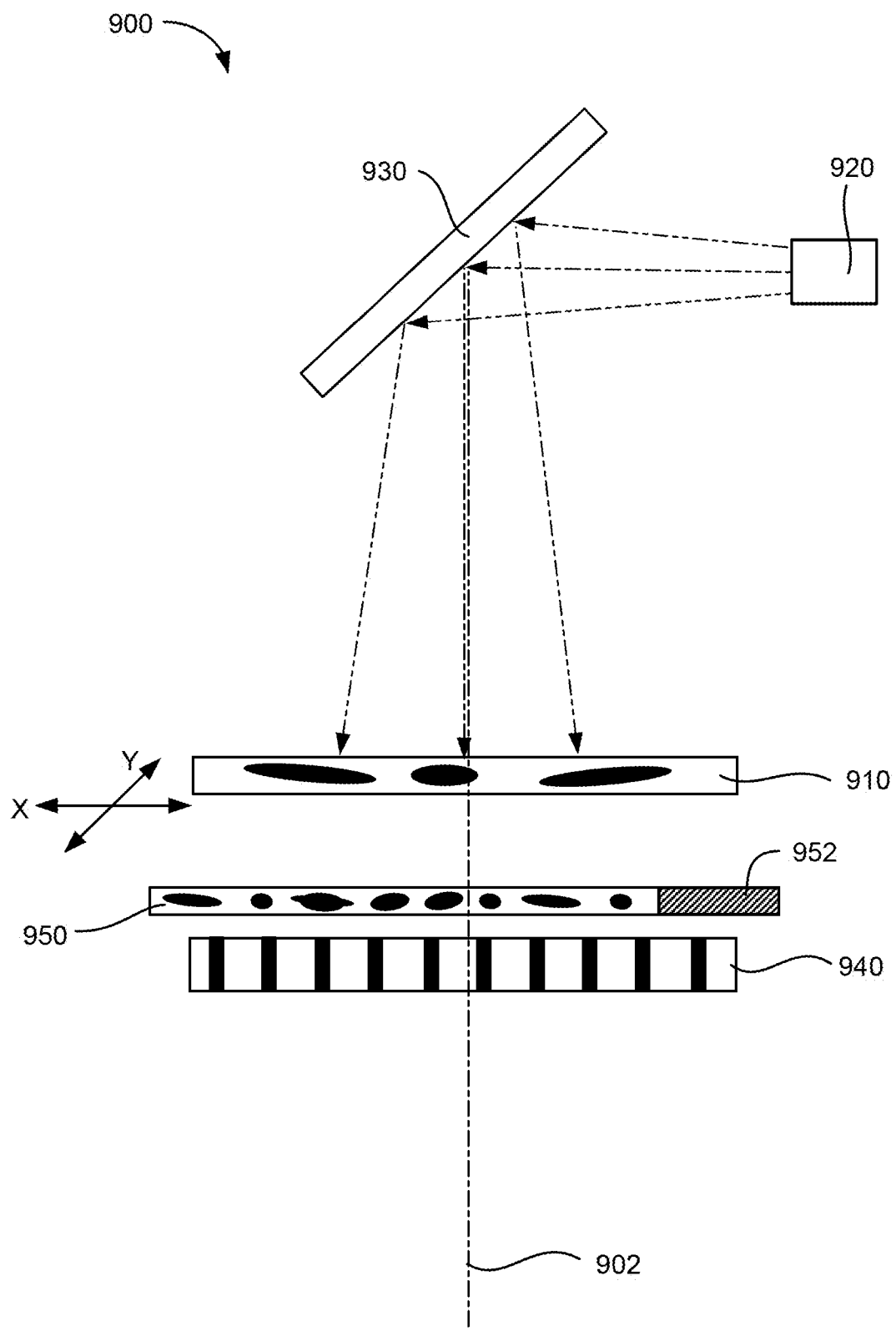
FIG. 9 shows a schematic diagram of an imaging system according to some embodiments.

FIG. 9 shows a schematic diagram of an imaging system 900 according to some embodiments. The imaging system 900 includes an image sensor 940. A sample 910 to be imaged may be placed above the image sensor 940. For example, the sample 910 may be held by a sample mount (not shown in FIG. 9).

The imaging system 900 further includes a light source 920. The light source 920 may comprise a laser or a light-emitting diode (LED), and is configured to emit a coherent or partially coherent light beam to be incident on the sample 910. The light beam may be collimated, partially collimated, or uncollimated. The imaging system 900 may include a mirror 930 positioned substantially at a 45 degree angle with respect to the path of the light beam emitted by the light source 920, so as to fold the light beam for a more compact configuration. The mirror 930 is optional.

The imaging system 900 further includes a mask 950 positioned downstream from the sample 910 along an optical axis 902 of the imaging system 900, and above the image sensor 940. The mask 950 may include an unknown pattern formed thereon. Thus, as the light beam is transmitted through the sample 910 and the mask 950, a diffused image may be formed at the image sensor 940. In some embodiments, the mask 950 may include an area 952 that is free of the pattern. Thus, the image sensor 940 may detect an image of a feature on the sample 910. By tracking the movement of the feature, the movement of the sample 910 may be tracked. The detected positional shift of the sample is used to recover the sample and/or the mask profile in the reconstruction process.

The imaging system 900 further includes a translation mechanism (not shown in FIG. 9) coupled to the sample mount and configured to scan the sample 910 to a plurality of sample positions in a plane (e.g., the X-Y plane) substantially perpendicular to the optical axis 902 of the imaging system 900. According to various embodiments, the sample 910 may be translated in one dimension (e.g., in the X direction or the Y direction), or in two dimensions (e.g., in both the X and the Y directions).

As the sample 910 is scanned, the diffused image formed at the image sensor 940 may shift accordingly. The image sensor 940 is configured to capture a plurality of images as the sample 910 is scanned to the plurality of sample positions. Each respective image corresponds to a respective sample position. The plurality of images may be processed by a processor (not shown in FIG. 9) to produce a complex profile of the sample 910 based on cross-correlations among the plurality of images.

According to some embodiments, the reconstruction process may include steps similar to steps S301-S309 as discussed above.

Imaging via Translated Phase Modulation Using a Height-Varying Phase Mask

Figure 10A:
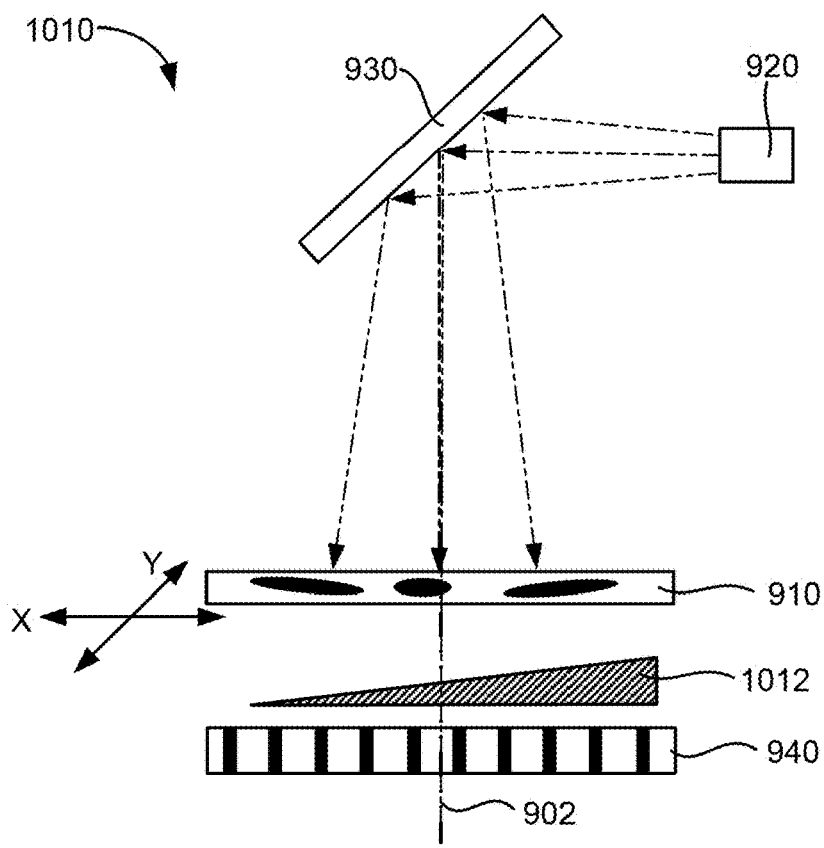
FIG. 10A shows a schematic diagram of an imaging system according to some embodiments.
Figure 10B:
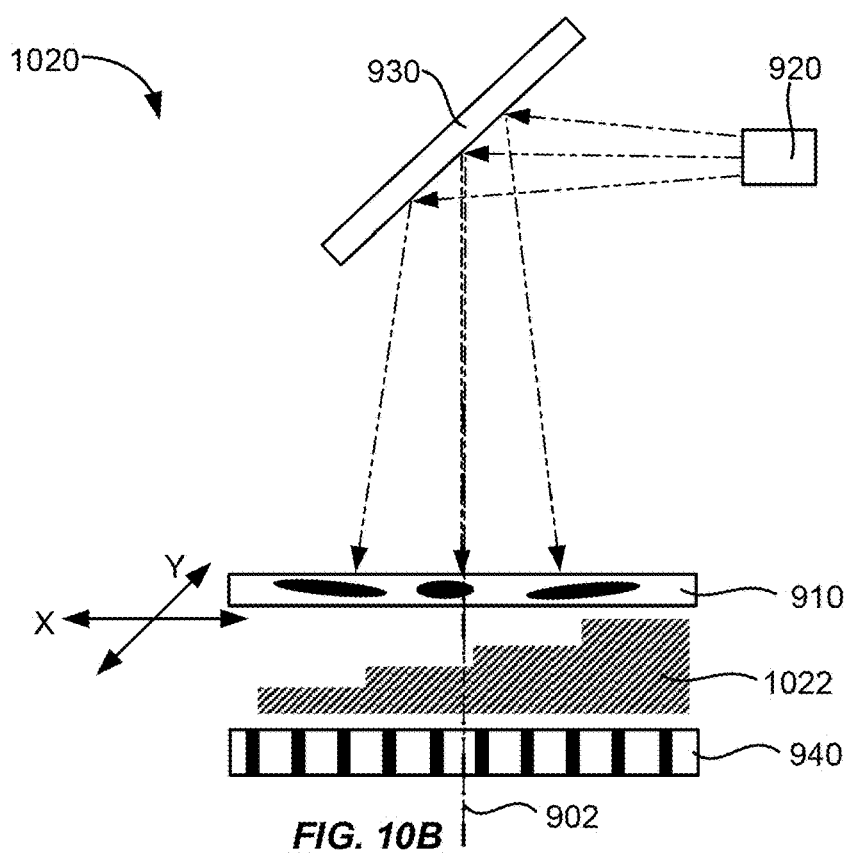
FIG. 10B shows a schematic diagram of an imaging system according to some embodiments.

FIG. 10A shows a schematic diagram of an imaging system 1010 according to some embodiments. The imaging system 1010 is similar to the imaging system 900 illustrated in FIG. 9A, except that the mask 950 is replaced by a phase mask 1012. The phase mask 1012 may comprise a transparent plate with varying thicknesses across the lateral plane (e.g., the X-Y plane) of the phase mask 1012. In the embodiment illustrated in FIG. 10A, the phase mask 1012 may be a wedge-shaped prism, with its thickness varying continuously (e.g., linearly) along the X-axis (or the Y-axis). FIG. 10B shows an alternative embodiment, in which a phase mask 1022 has a step-like cross section with its thickness varying discretely along the X-axis (or the Y-axis). According to various embodiments, the thickness of the phase mask 1012 may vary in various ways. For example, the thickness may vary in a non-linear fashion from one side to the other, or may vary in a non-monotonically from one side to the other. In some embodiments, the thickness of the phase mask 1012 may vary in a random fashion.

According to some embodiments, the reconstruction process may include steps similar to steps S301-S309 as discussed above.

Imaging via Translated Phase Modulation with a Tilted Image Sensor

Figure 11:
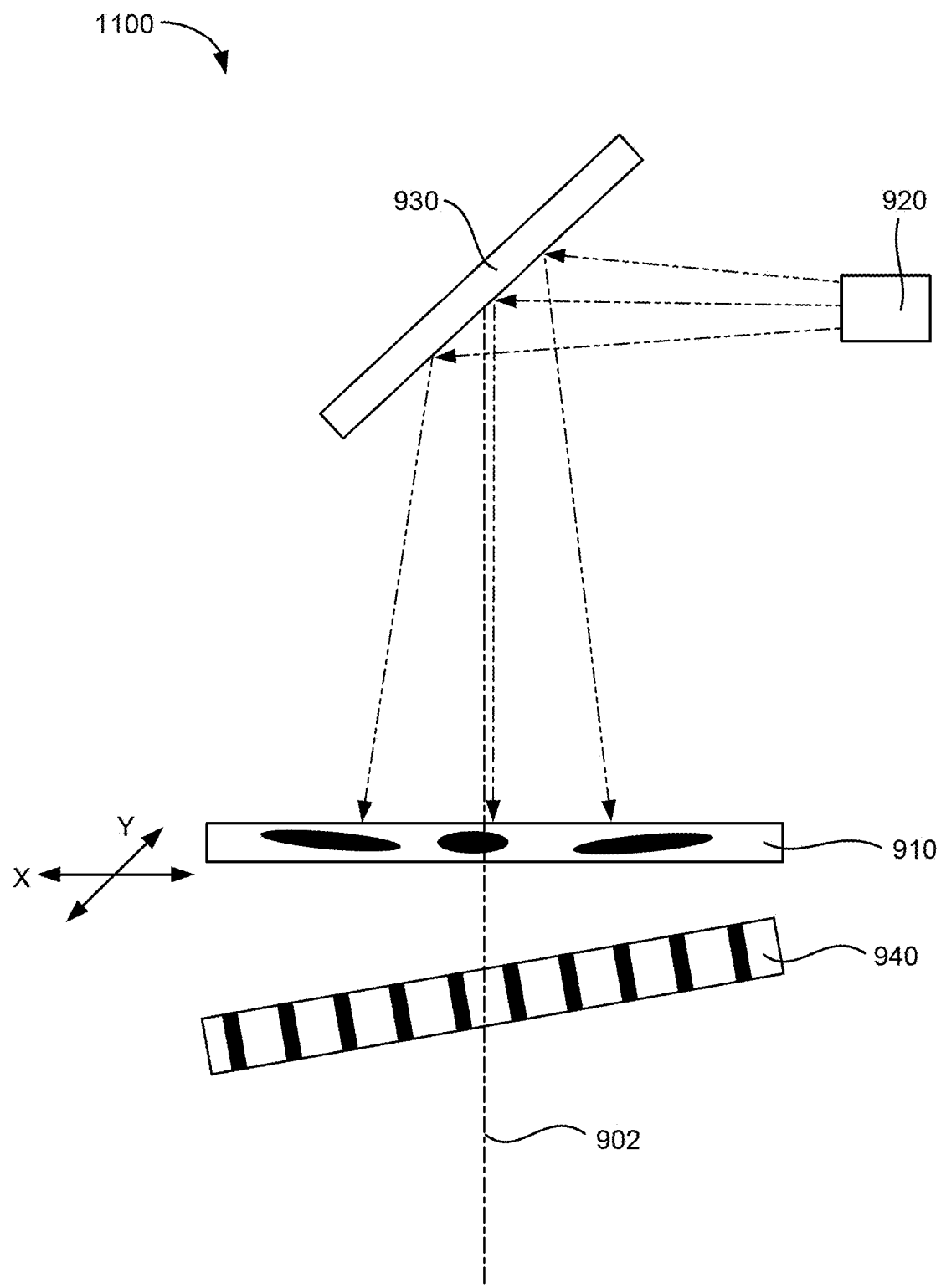
FIG. 11 shows a schematic diagram of an imaging system according to some embodiments.

FIG. 11 shows a schematic diagram of an imaging system 1100 according to some embodiments. The imaging system 1100 is similar to the imaging system 900 illustrated in FIG. 9A, but here, the mask 950 is omitted and the image sensor 940 is tilted with respect to the optical axis 902 of the imaging system 1100. The air gap between the sample 910 and the image sensor 940 may serve as a height-varying phase mask.

According to some embodiments, the reconstruction process may include steps similar to steps S301-S309 as discussed above.

Imaging via Wavelength-Encoded Mask Modulation

Figure 12:
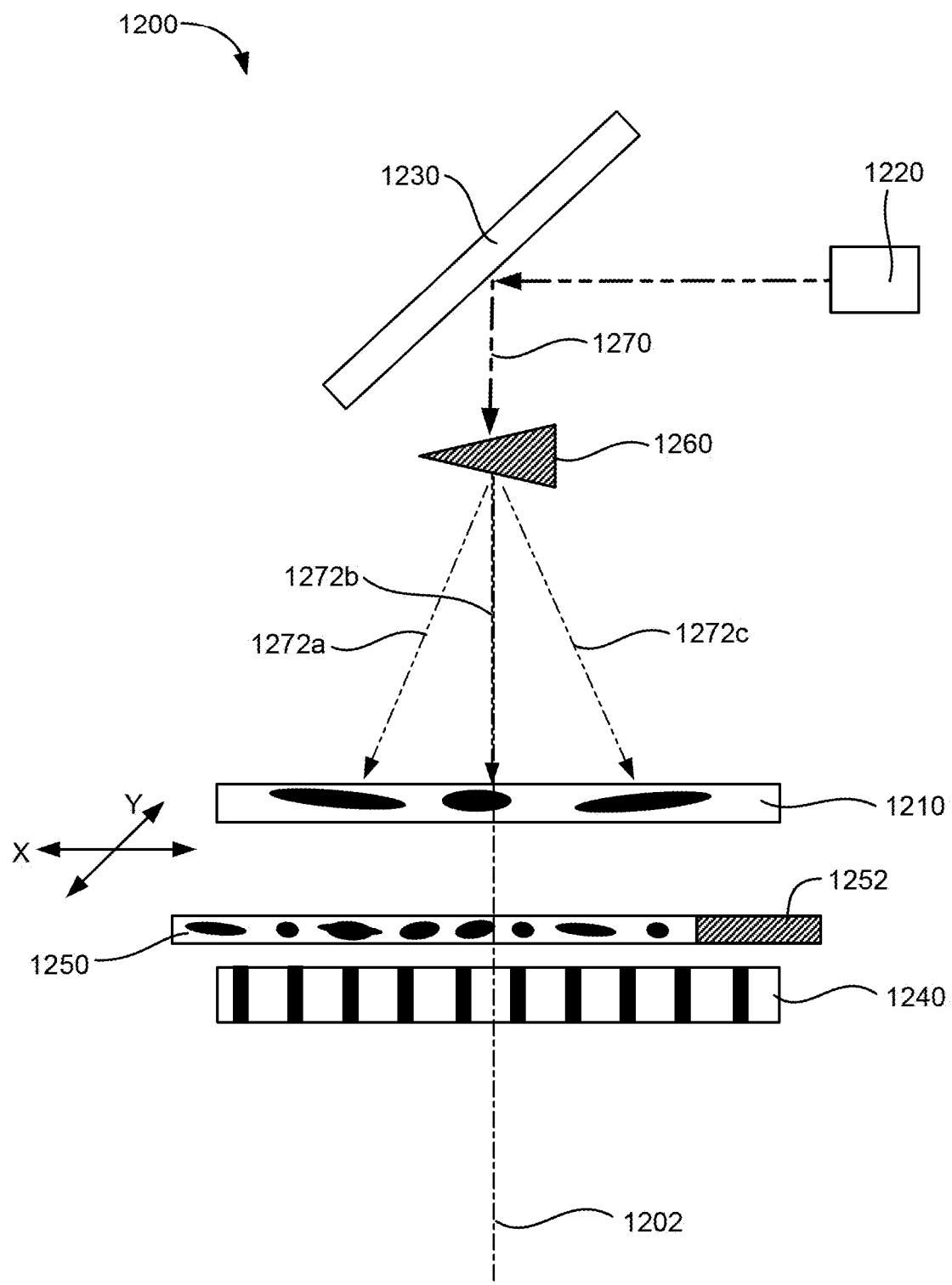
FIG. 12 shows a schematic diagram of an imaging system according to some embodiments.

FIG. 12 shows a schematic diagram of an imaging system 1200 according to some embodiments. The imaging system 1200 includes an image sensor 1240. A sample 1210 to be imaged may be placed above the image sensor 1240. For example, the sample 1210 may be held by a sample mount (not shown in FIG. 12).

The imaging system 1200 further includes a light source 1220. The light source 1220 is configured to emit a light beam 1270 of multiple wavelengths. The light beam 1270 may be collimated, partially collimated, or uncollimated. In some embodiments, the light source 1220 may comprise multiple light-emitting elements (e.g., 3, 5, or up to 20 laser diodes) configured to emit light in different wavelengths. Alternatively, the light source 1220 may comprise a broadband light source, for example, a broadband light-emitting diode (LED). The imaging system 1200 may include a mirror 1230 positioned substantially at a 45 degree angle with respect to the path of the light beam 1270 emitted by the light source 1220, so as to fold the light beam 1270 for a more compact configuration. The mirror 1230 is optional.

The imaging system 1200 further includes a light dispersing element 1260 configured to receive and disperse the light beam 1270 into a plurality of sub light beams 1272a, 1272b, and 1272c, each sub light beam 1272a, 1272b, or 1272c corresponding to a respective wavelength. The light dispersing element 1260 may comprise, for example, a prism, an optical diffraction grating, or the like. Although only three sub light beams are illustrated in FIG. 12, there can be more or fewer than three sub light beams according to various embodiments. The plurality of sub light beams 1272a, 1272b, and 1272c may be incident on the sample at different angles of incidence.

The imaging system 1200 further includes a mask 1250 positioned downstream from the sample 1210 along an optical axis 1202 of the imaging system 1200, and above the image sensor 1240. The mask 1250 may include an unknown pattern formed thereon. Thus, as the plurality of sub light beams 1272a, 1272b, and 1272c is transmitted through the sample 1210 and the mask 1250, a diffused image may be formed at the image sensor 1240. The diffused image may be a superposition of a plurality of sub-images corresponding to the different wavelengths of the plurality of sub light beams 1272a, 1272b, and 1272c. Since the plurality of sub light beams 1272a, 1272b, and 1272c is incident on the mask 1250 at different angles of incidence, the light modulation produced by the mask 1250 may be wavelength-dependent. The wavelength-dependent feature of the light modulation may be used to recover the profiles of the sample 1210 at different wavelengths in the phase retrieval process.

In some embodiments, the mask 950 may include an area 952 that is free of the pattern. Thus, the image sensor 940 may detect an image of a feature on the sample 910. By tracking the movement of the feature, the movement of the sample 910 may be tracked. The detected positional shift of the sample is used to recover the sample and/or the mask profile in the reconstruction process.

The imaging system 1200 further includes a translation mechanism (not shown in FIG. 12) coupled to the sample mount and configured to scan the sample 1210 to a plurality of sample positions in a plane (e.g., the X-Y plane) substantially perpendicular to the optical axis 1202 of the imaging system 1200. According to various embodiments, the sample 1210 may be translated in one dimension (e.g., in the X direction or the Y direction), or in two dimensions (e.g., in both the X and the Y directions).

As the sample 1210 is scanned, the diffused image (e.g., a superposition of a plurality of sub-images corresponding to the different wavelengths) formed at the image sensor 1240 may shift accordingly. The image sensor 1240 is configured to capture a plurality of images as the sample 1210 is scanned to the plurality of sample positions. Each respective image corresponds to a respective sample position. The plurality of images may be processed by a processor (not shown in FIG. 12) to recover complex profiles of the sample 1210 at different wavelengths based on cross-correlations among the plurality of images.

According to some embodiments, the reconstruction process may include the following steps.

At S401, initialize multiple object (e.g., sample) estimates $O_t(x,y)$ and the diffuser pattern or the modulation mask pattern $P_t(x,y)$, where 't=1,2 ... T'. T represents the number of wavelengths used for illumination.

At S402, estimate the translated position of the translated sample position $(x_i, y_i)$ based on cross-correlation or mutual information of the captured images or other tracking algorithms.

At S403, according to the imaging model, $O_t(x,y)$ is propagated '$d_1$' to the modulate plane based on translated position $(x_i, y_i)$, to obtain:

$$O_{t,d_1}(x-x_i, y-y_i) = O_t(x-x_i, y-y_i) * PSF_{free}(d_1).$$

Then generate the corresponding target image $I_{t,i}(x,y)$ at the image sensor plane as follows:

$$I_{t,i}(x,y) = \left|O_{t,d_1}(x-x_i, y-y_i) \cdot P_t(x,y) * PSF_{free}(d_2)\right|^2_{\downarrow M} = $$
$$|\varphi_{t,i}(x,y) * PSF_{free}(d_2)|^2_{\downarrow M} = |\psi_{t,i}(x,y)|^2_{\downarrow M},$$

where '·' stands for point-wise multiplication, and '*' denotes the convolution operation. '$d_1$' is the distance between the object and the diffuser, and '$d_2$' is the distance between the diffuser and the image sensor. $PSF_{free}(d)$ is used to model the point spread function (PSF) for free-space propagation over distance 'd'. '$\downarrow M$' in the above equation represents the down-sampling process.

At S404, sum $I_{t,i}(x,y)$ up to generate the incoherent mixture:

$$I_{incoherent,i}(x,y) = \Sigma_{t=1}^T I_{t,i}(x,y).$$

At S405, update $\psi_{t,i}(x,y)$ using the ratio between the actual measurement $I_{m,i}(x,y)$ and $I_{incoherent}(x_i,y_i)$ and keep the phase unchanged:

$$\psi'_{t,i}(x,y) = \psi_{t,i}(x,y) \left( \frac{\sqrt{I_{m,i}(x,y)_{\uparrow M}}}{\sqrt{I_{incoherent,i}(x,y) * ones(M,M)_{\downarrow M \uparrow M}}} \right)$$

The term $I_{m,i}(x,y)_{\uparrow M}$ represents the nearest-neighbor up-sampling of the captured image $I_{m,i}(x,y)$. In the denominator of equation, the term $I_{incoherent,i}(x,y)$ first convolutes with an average filter (M by M all-ones matrix). It will be then down-sampled by M-times followed by M-times nearest-neighbor up-sampling. In some embodiments, other up-sampling factor (e.g., M=4, 5, 6 ... ) may be used.

At S406, back propagate $\psi'_{t,i}(x,y)$ to the modulate plane:

$$\varphi'_{t,i}(x,y) = \psi'_{t,i}(x,y) * PSF_{free}(-d_2).$$

At S407, update $O_{t,d_1}(x-x_i, y-y_i)$ and modulation mask pattern $P_t(x,y)$:

$$O_{t,d_1}^{update}(x-x_i, y-y_i) = O_{t,d_1}(x-x_i, y-y_i) + $$
$$\frac{conj(P_t(x,y)) \cdot \{\varphi'_{t,i}(x,y) - \varphi_{t,i}(x,y)\}}{(1-\alpha_{obj})|O_{t,d_1}(x-x_i, y-y_i)|^2 + \alpha_{obj}|O_{t,d_1}(x-x_i, y-y_i)|^2_{max}}$$

$$P_t^{update}(x,y) = P_t(x,y) + \frac{conj(O_{t,d_1}(x-x_i, y-y_i)) \cdot \{\varphi'_{t,i}(x,y) - \varphi_{t,i}(x,y)\}}{(1-\alpha_p)|P_t(x,y)|^2 + \alpha_p|P_t(x,y)|^2_{max}}.$$

At S408, update the shifted object $O_t(x-x_i, y-y_i)$ using:

$$O_t^{update}(x-x_i, y-y_i) = O_{t,d_1}^{update}(x-x_i, y-y_i) * PSF_{free}(-d_1).$$

At S409, j=j+1 and repeat steps S402-S408.

At S410, repeat steps S402-S409 until the solution converges.

At S411, propagate the recovered $O_t^{update}(x,y)$ to the object plane.

It should be appreciated that the specific steps S401-S411 discussed above provide a particular reconstruction process according to some embodiments. Other sequences of steps may also be performed according to alternative embodiments. For example, alternative embodiments of the present invention may perform the steps outlined above in a different order. Moreover, the individual steps S401-S411 may include multiple sub-steps that may be performed in various sequences as appropriate to the individual step. Furthermore, additional steps may be added or removed depending on the particular applications. One of ordinary skill in the art would recognize many variations, modifications, and alternatives.

An advantage of the imaging systems illustrated in FIGS. 5-9, 10A-10B, 11, and 12 may be that diffuser modulation is performed at the detection path. Different from illumination-based approaches, the recovered image depends only on how the complex wavefront exits the sample. Therefore, the sample thickness becomes irrelevant during reconstruction. After recovery, the complex wavefront may be propagated to any position along the optical axis.

Figure 13:
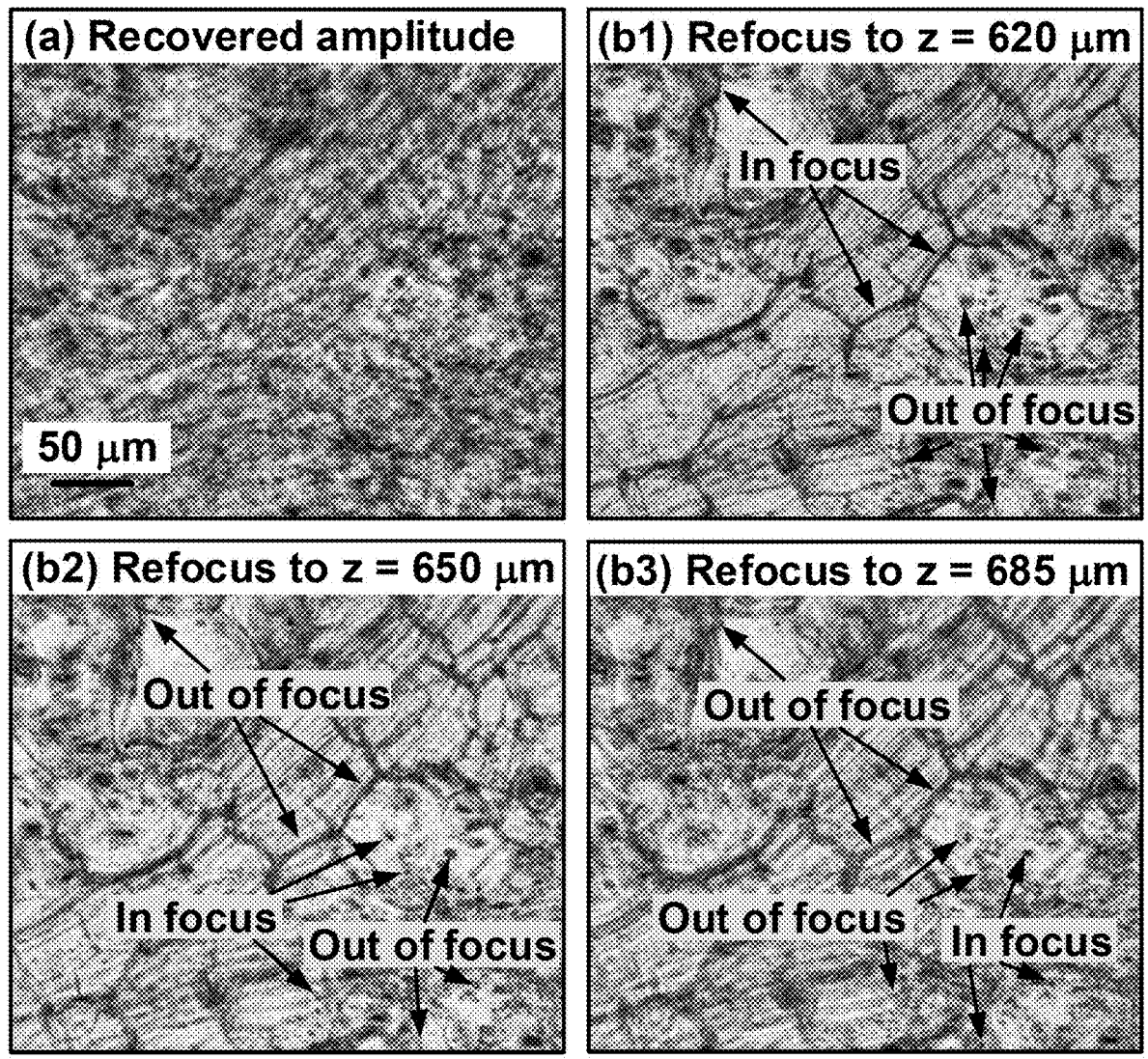
FIG. 13 shows the recovered images of a thick potato sample obtained using an imaging system according to some embodiments.

This concept was validated using a thick potato sample. FIG. 13 shows the recovered images. The inset (a) shows the recovered amplitude image of the exit wavefront from the sample. The insets (b1), (b2), and (b3) show the recovered amplitude image of the sample after digitally propagating to z=620 µm, z=650 µm, and z=685 µm, respectively. The cell walls are in focus in the inset (b1), and the organelles are in focus in the insets (b2) and (b3).

Three-Dimensional Tomographic Imaging

According to some embodiments, the imaging systems described above, the light source may be replaced by a light source array, such as an LED array. Different light sources in the light source array may illuminate the sample at different angles of incidence. A plurality of complex profiles of the sample may be recovered, each respective profile corresponding to a respective light source. A three-dimensional tomographic image of the sample may be reconstructed from the plurality of complex profiles of the sample.

The imaging systems discussed above according to embodiments of the present invention may afford numerous advantages. For example, it is not necessary to know the position of the speckle pattern or the mask modulation. Therefore, the image acquisition process can be free-run. That is, any scanning motion (e.g., the scanning of the mirror 130 shown in FIG. 1, the scanning of the mask 550 shown in FIGS. 5 and 6, the scanning of the transparent plates 760 and 770 shown in FIGS. 7 and 8, the scanning of the sample 910 shown in FIGS. 9, 10A-10B, and 11, and the scanning of the sample 1210 shown in FIG. 12) can be run "blindly" without precise control, such as synchronization, triggering, timing, or the like. In addition, the use of low-cost galvo scanner in the imaging system shown in FIG. 1 may be advantageous compared to conventional multi-height implementations. The mechanical scanning time may be negligible according to embodiments of the present invention. Furthermore, the imaging systems may provide true quantitative contrast of a complex object. The imaging systems may provide solutions for addressing point-of-care and telemedicine related challenges.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An imaging system comprising:
   a sample mount for holding a sample to be imaged;
   a plurality of light emitting elements configured to illuminate the sample;
   a light dispersing element configured to disperse light emitted by each of the plurality of light emitting elements into a plurality of sub light beams to be incident on the sample at a plurality of angles of incidence, each respective sub light beam corresponding to a respective wavelength and is incident on the sample at a respective angle of incidence;
   a translation mechanism coupled to the sample mount and configured to scan the sample to a plurality of sample positions in a plane substantially perpendicular to an optical axis of the imaging system;
   a mask positioned downstream from the sample along the optical axis;
   an image sensor positioned downstream from the mask along the optical axis, the image sensor configured to acquire a plurality of images as the sample is translated to the plurality of sample positions, each respective image corresponding to a respective sample position; and
   a processor configured to process the plurality of images to recover a plurality of complex profiles of the sample based on positional shifts extracted from the plurality of images, each respective complex profile of the sample corresponding to a respective one of the plurality of light elements from which a three-dimensional tomographic image of the sample is reconstructed.

2. The imaging system of claim 1, wherein each of the light emitting elements of the plurality of light sources illuminate the sample at a different angle of incidence.

3. The imaging system of claim 1, wherein the positional shifts are extracted from the plurality of images using cross-correlation or mutual information among the plurality of images.

4. The imaging system of claim 1, wherein the plurality of light emitting elements are formed by a light source array.

5. The imaging system of claim 1, wherein the plurality of light elements each comprise a light emitting diode, each respective light emitting diode configured to emit light in a respective wavelength.

6. The imaging system of claim 1, wherein the light dispersing element comprises a prism or a diffraction grating.

7. The imaging system of claim 1, wherein the sample is scanned in one dimension or two dimensions.

8. The imaging system of claim 1, wherein the light emitted from each of the plurality of light sources is coherent or partially coherent.

9. The imaging system of claim 1, wherein the mask comprises a phase mask.

10. The imaging system of claim 9, wherein the phase mask comprises a transparent material with varying thicknesses across a lateral plane perpendicular to the optical axis of the imaging system.

11. The imaging system of claim 10, wherein the phase mask comprises a wedge-shaped prism.

12. The imaging system of claim 10, wherein the phase mask is characterized by a multi-step cross section.

13. A method of imaging a sample, the method comprises:
   irradiating a sample positioned in a sample mount with a plurality of light emitting elements;
   dispersing light emitted by each of the plurality of light emitting elements into a plurality of sub light beams to be incident on the sample at a plurality of angles of incidence, each respective sub light beam corresponding to a respective wavelength and is incident on the sample at a respective angle of incidence;
   scanning the sample to a plurality of sample positions in a plane substantially perpendicular to an optical axis of the imaging system;
   acquiring, via an image sensor positioned downstream of the sample, a plurality of images through a mask as the sample is translated to the plurality of sample positions, each respective image corresponding to a respective sample position; and
   reconstructing a three-dimensional tomographic image of the sample by processing the plurality of images to recover a plurality of complex profiles of the sample based on positional shifts extracted from the plurality of images, each respective complex profile of the sample corresponding to a respective one of the plurality of light emitting elements.

14. The method of claim 13, further comprising:
   illuminating the sample a different angle of incidence from each of the light emitting elements of the plurality of light emitting elements.

15. The method of claim 13, further comprising:
   extracting the positional shifts from the plurality of images using cross-correlation or mutual information among the plurality of images.

16. The method of claim 13, further comprising:
   forming a light array with the plurality of light emitting elements.

17. The method of claim 13, wherein the plurality of light emitting elements each comprise a light emitting diode, each respective light emitting diode configured to emit light in a respective wavelength.

18. The method of claim 13, wherein the light dispersing element comprises a prism or a diffraction grating.

19. The imaging system of claim 13, further comprising:
   scanning the sample in one dimension or two dimensions.

20. The method of claim 13, wherein the mask comprises a phase mask.

* * * * *